(12) United States Patent
Chou

(10) Patent No.: US 8,514,569 B2
(45) Date of Patent: Aug. 20, 2013

(54) LED BACKLIT SIGN

(75) Inventor: Kun-Liang Chou, New Taipei (TW)

(73) Assignee: Litemax Electronics Inc., New Taipei (TW)

( * ) Notice: Subject to any disclaimer, the term of this patent is extended or adjusted under 35 U.S.C. 154(b) by 297 days.

(21) Appl. No.: 13/118,494

(22) Filed: May 30, 2011

(65) Prior Publication Data

US 2012/0307454 A1    Dec. 6, 2012

(51) Int. Cl.
*H05K 7/20* (2006.01)
*F21V 7/04* (2006.01)
*G09F 13/18* (2006.01)

(52) U.S. Cl.
USPC ............... 361/690; 40/544; 40/546; 361/704; 361/710; 362/293

(58) Field of Classification Search
None
See application file for complete search history.

(56) References Cited

U.S. PATENT DOCUMENTS

| | | | | |
|---|---|---|---|---|
| 6,539,656 | B2* | 4/2003 | Maas et al. | 40/546 |
| 6,745,506 | B2* | 6/2004 | Maas et al. | 40/546 |
| 8,002,455 | B2* | 8/2011 | Lai et al. | 362/620 |
| 2001/0049896 | A1* | 12/2001 | Doerr et al. | 40/673 |
| 2003/0046842 | A1* | 3/2003 | Maas et al. | 40/546 |
| 2010/0271819 | A1* | 10/2010 | Kristoffersen et al. | 362/235 |
| 2012/0159823 | A1* | 6/2012 | Gibb et al. | 40/606.01 |
| 2012/0176788 | A1* | 7/2012 | Van De Ven et al. | 362/231 |

* cited by examiner

*Primary Examiner* — Gregory Thompson

(57) ABSTRACT

An illuminated sign includes a plurality of straight fin heat sinks framed together; a plurality of LED plates framed together, each LED plate comprising a plurality of LEDs arranged in rows on a front surface, and a plate heat sink on a rear surface, the plate heat sinks being in contact with the straight fin heat sinks; and an LCD panel mounted in front of the LED plates by framing.

2 Claims, 10 Drawing Sheets

LED BACKLIT SIGN

BACKGROUND OF THE INVENTION

1. Field of the Invention

The invention relates to signs and more particularly to a light-emitting diode (LED) backlit sign with improved heat removal capability and other improved characteristics.

2. Description of Related Art

Conventional luminous billboards make use of cold cathode fluorescent lamp (CCFL) as light source. However, the CCFL has many disadvantages such as large volume, low light efficiency, short useful life, and environment pollution. Thus, they have been phased out. Light emitting diodes (LEDs), as an advancement of technology, have many advantages including high luminance, low power consumption, highly compatible with integrated circuits, long-term reliability, environmental friendliness and thus are becoming widely used as a light source.

There are a great array of LED billboards and signs disclosed in both patents and non-patent literature documents. Notwithstanding the prior art, the invention is neither taught nor rendered obvious thereby.

SUMMARY OF THE INVENTION

It is therefore one object of the invention to provide an illuminated sign comprising: a plurality of straight fin heat sinks framed together; a plurality of light-emitting diode (LED) plates framed together, each LED plate comprising a plurality of LEDs arranged in rows on a front surface, and a plate heat sink on a rear surface, the plate heat sinks being in contact with the straight fin heat sinks; and a liquid crystal display (LCD) panel mounted in front of the LED plates by framing.

The above and other objects, features and advantages of the invention will become apparent from the following detailed description taken with the accompanying drawings.

DETAILED DESCRIPTION OF THE INVENTION

Figure 1:
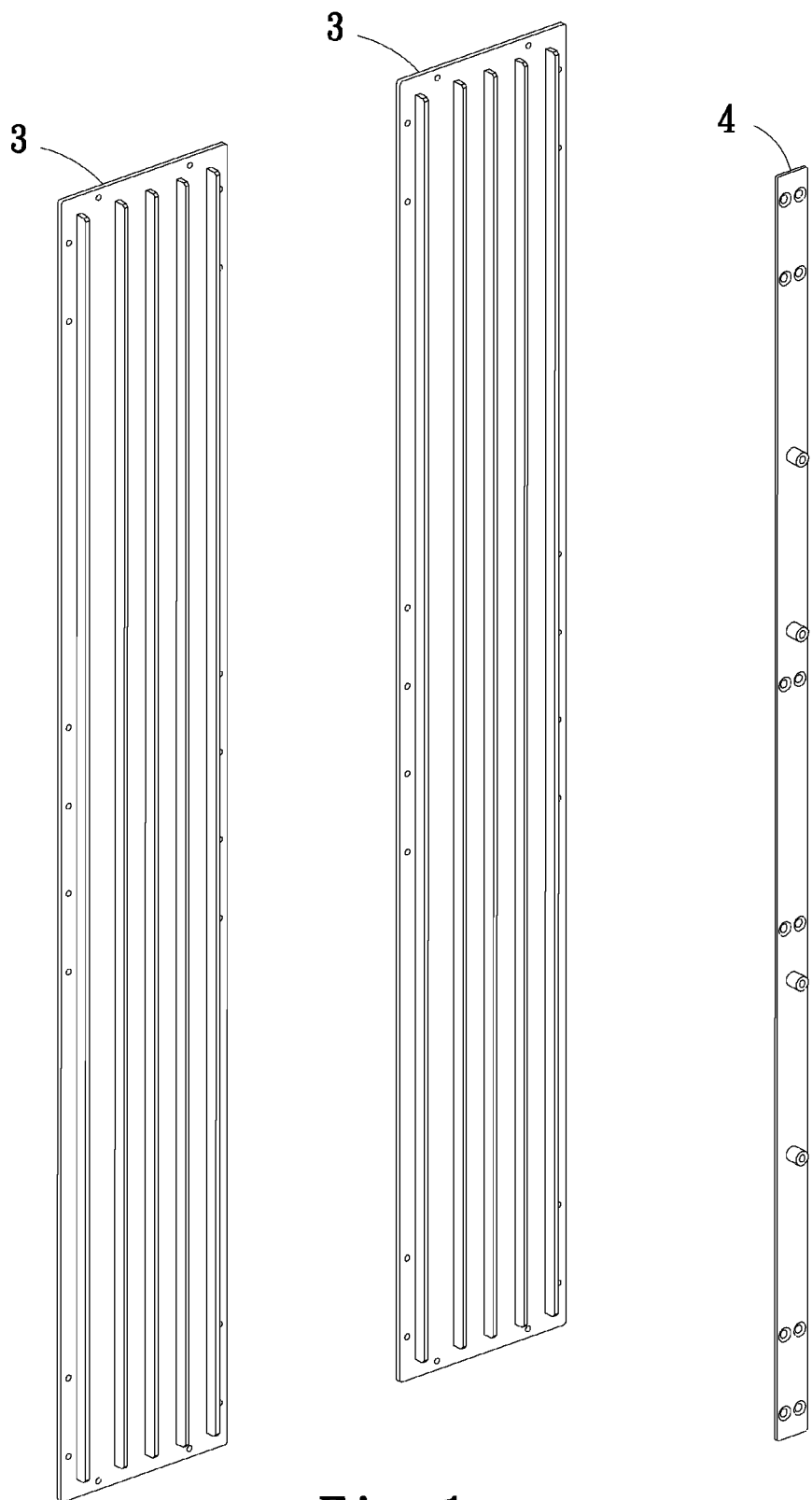
FIG. 1 is an exploded view of two heat sinks and a mounting member to be assembled according to the invention.
Figure 2:
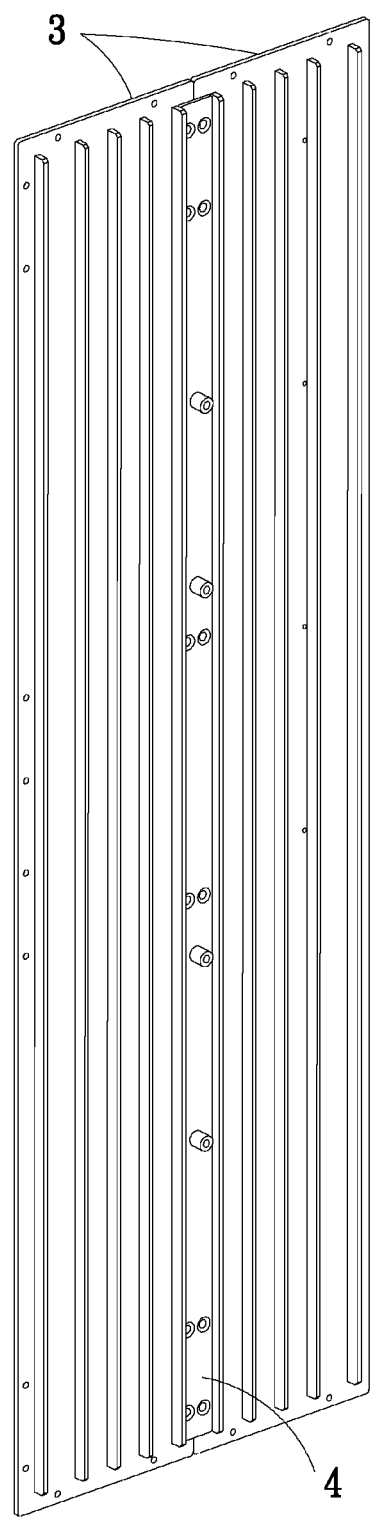
FIG. 2 is a perspective view of the assembled heat sinks and mounting member of FIG. 1.
Figure 3:
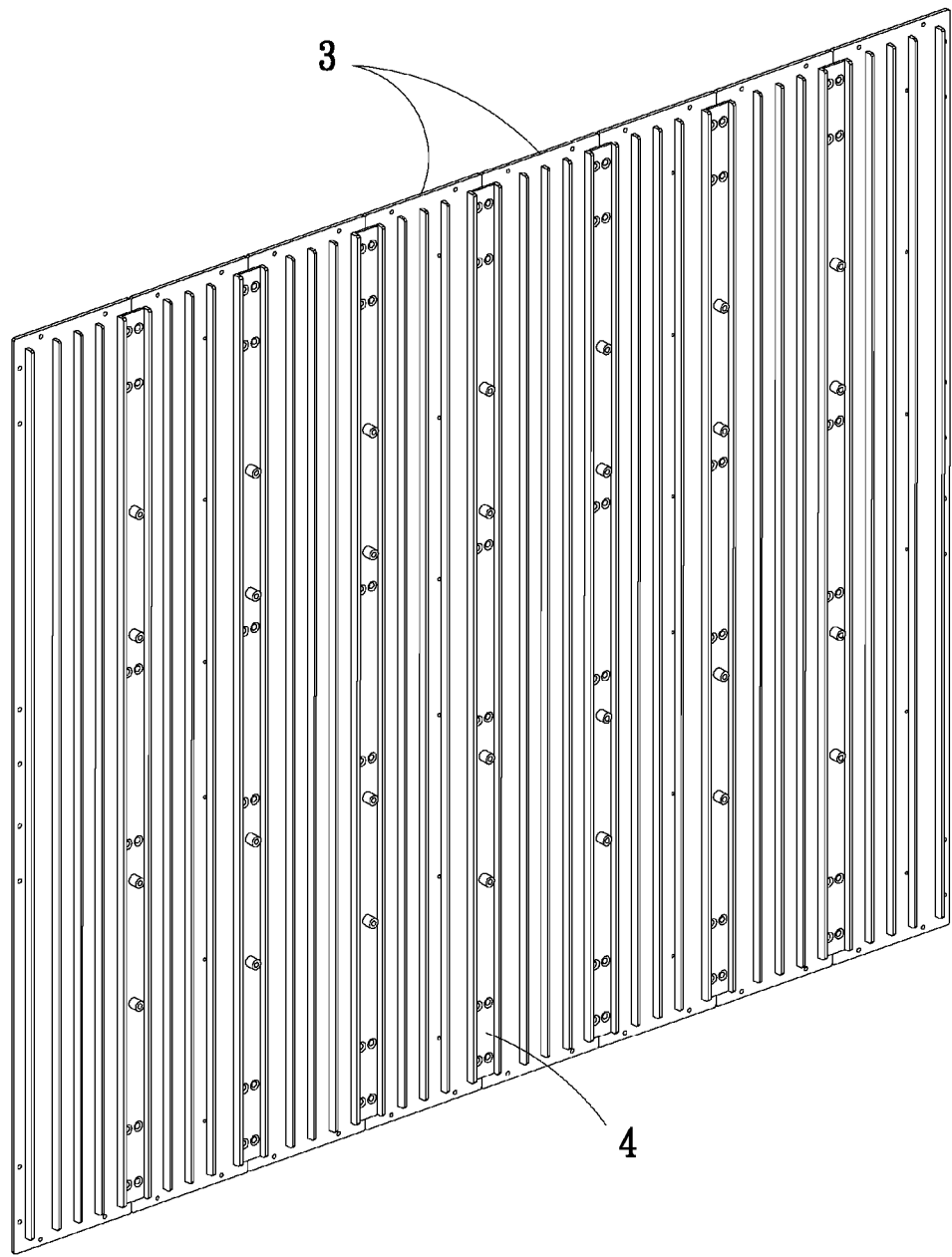
FIG. 3 is a perspective view of a number of heat sinks and mounting members assembled to form as a structure.
Figure 4:
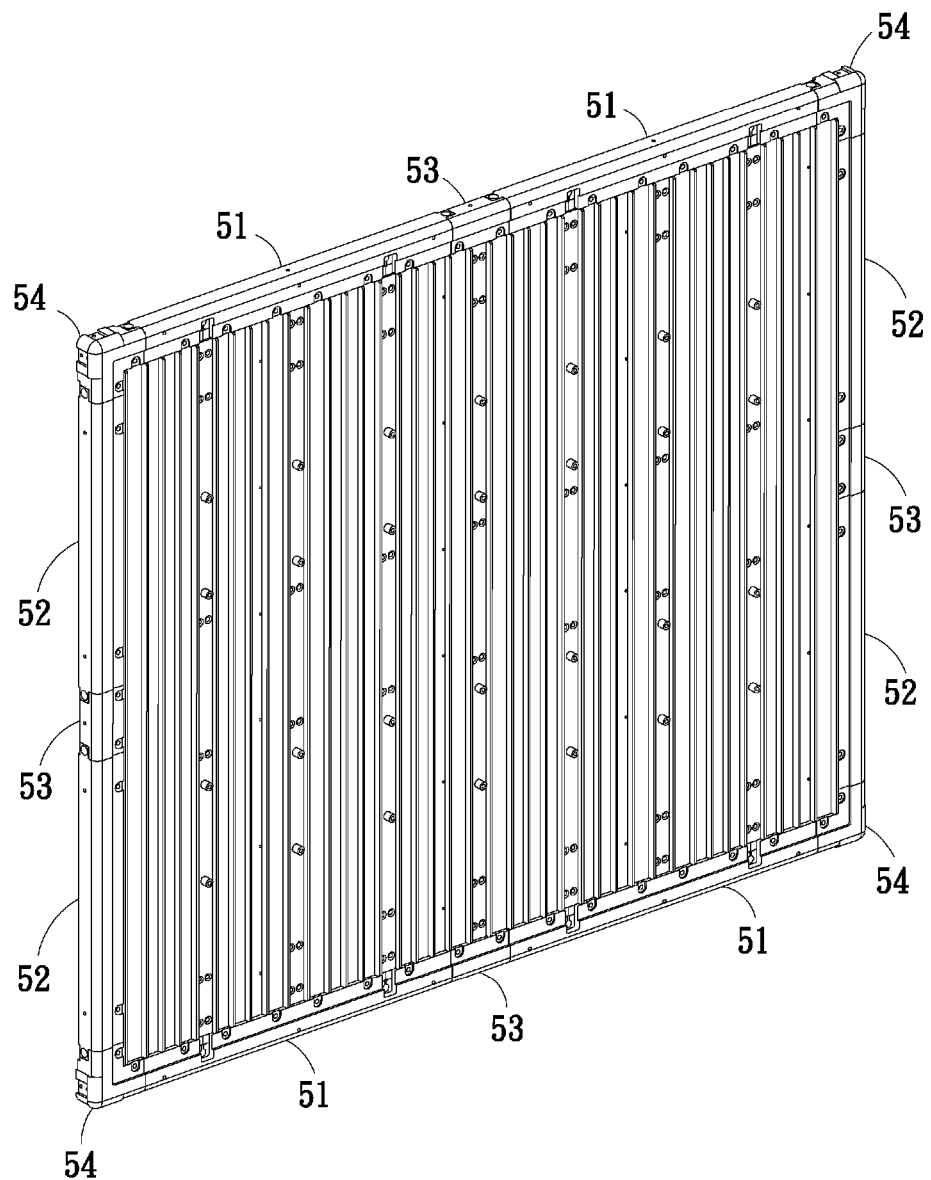
FIG. 4 is a perspective view of the structure being framed viewed from the front.
Figure 5:
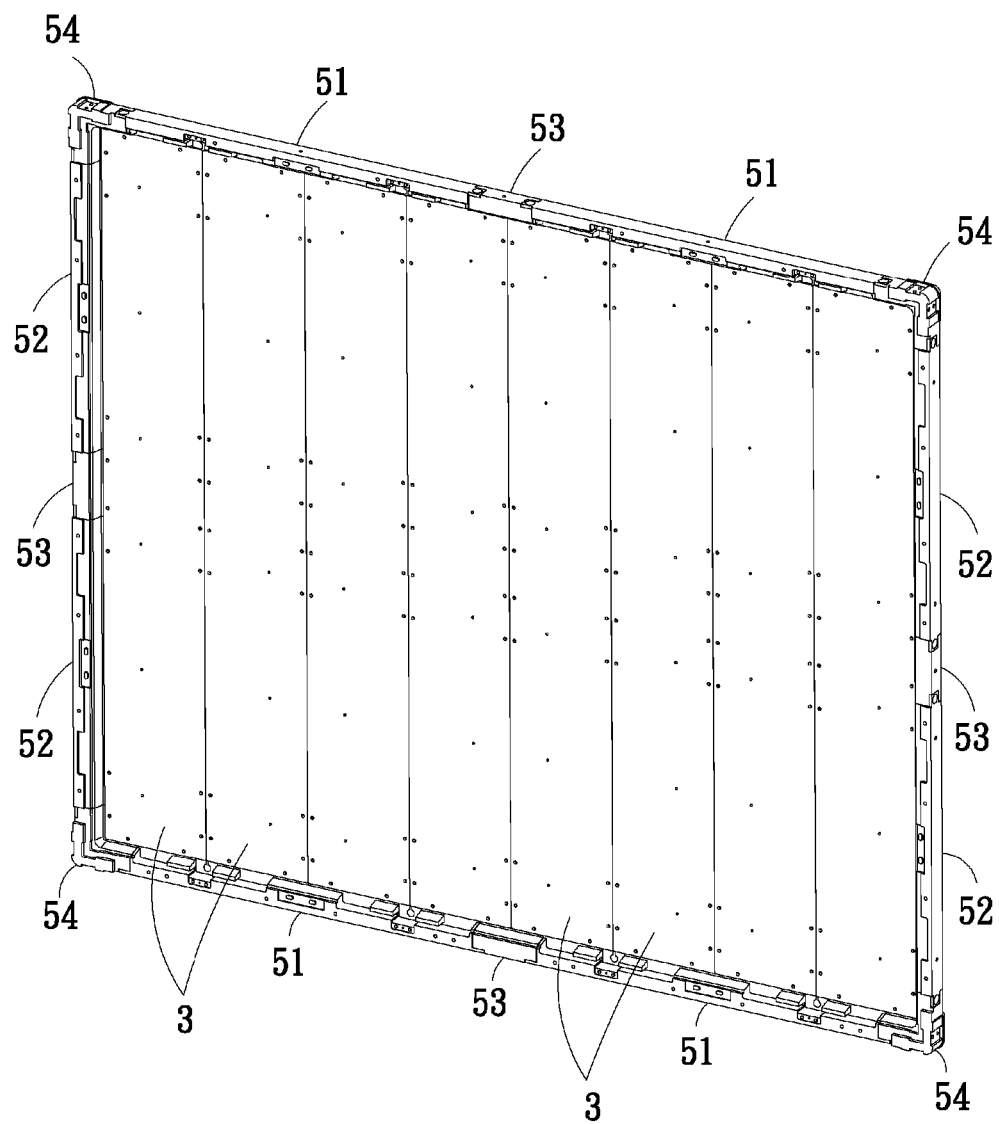
FIG. 5 is a perspective view of the framed structure viewed from the rear.
Figure 6:
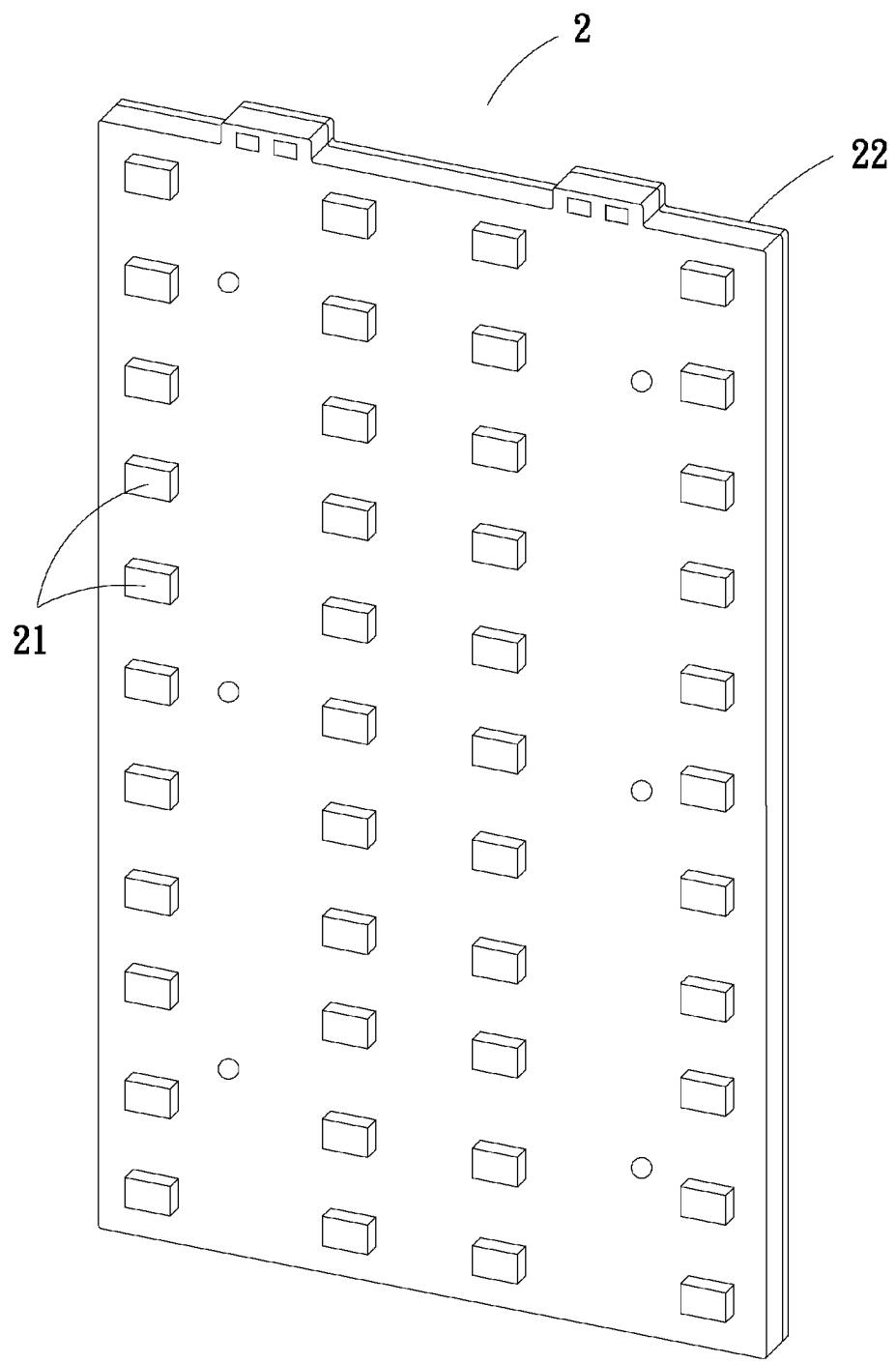
FIG. 6 is a perspective view of an LED plate.

Referring to FIGS. 1 to 10, an LED backlit sign 1 in accordance with the invention comprises the following components as discussed in detail below.

As shown in FIGS. 1 to 5, two rectangular heat sinks 3 each has a plurality of straight fins formed on one surface (i.e., straight fin heat sinks). A rectangular mounting member 4 is employed to securely join the heat sinks 3 as a unit. A plurality of such units can be assembled as a heat sink assembly of rectangle (see FIG. 3). Two cross frame elements 51 are joined by an intermediate joint 53 together they are mounted on each of top and bottom edges of the rectangular heat sink assembly, two side frame elements 52 are joined by another intermediate joint 53 together they are mounted on either side of the rectangular heat sink assembly, and further four corner joints 54 each is employed to join two adjacent cross frame element 51 and side frame element 52 at each of four corners of the rectangular heat sink assembly.

Figure 7:
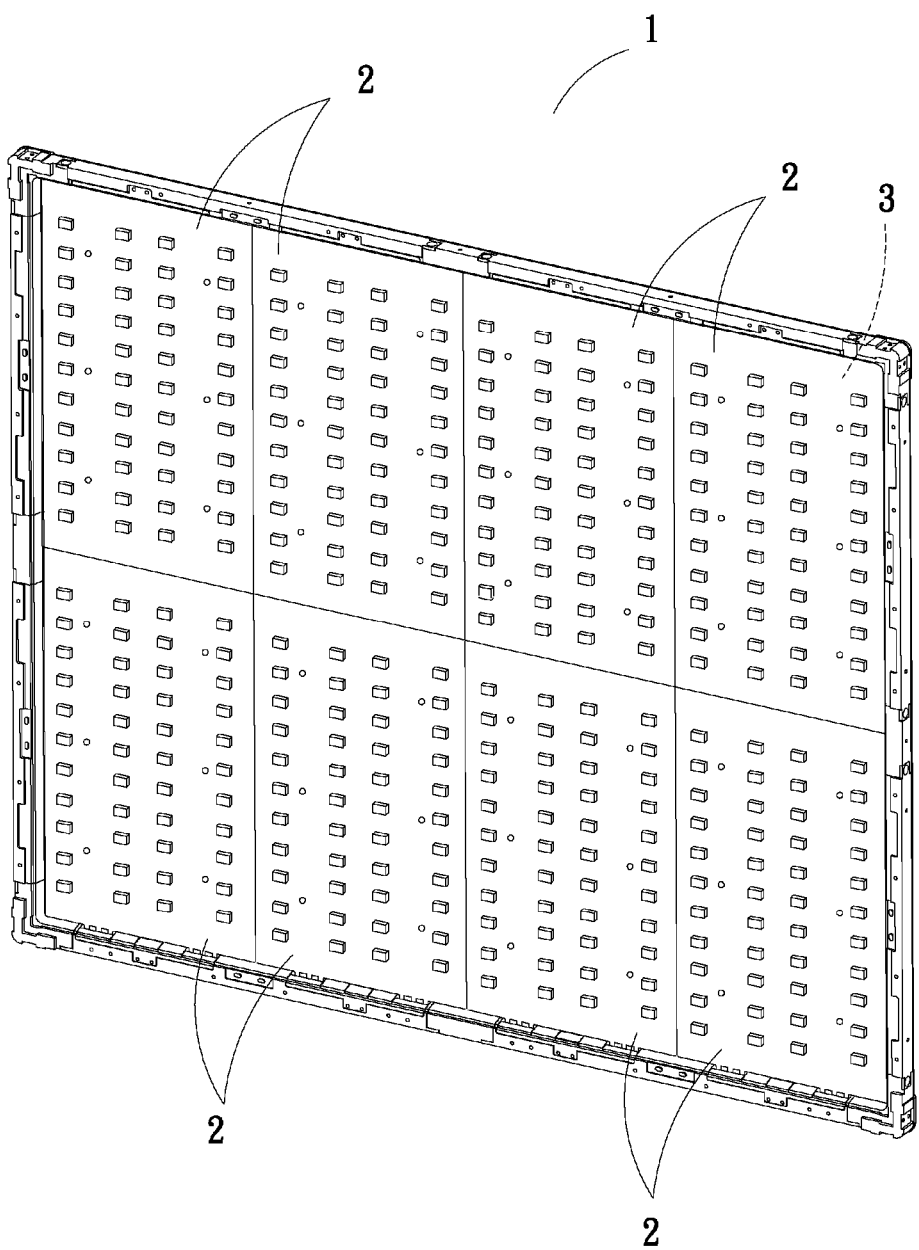
FIG. 7 is a perspective view of a number of LED plates assembled by framing.
Figure 8:
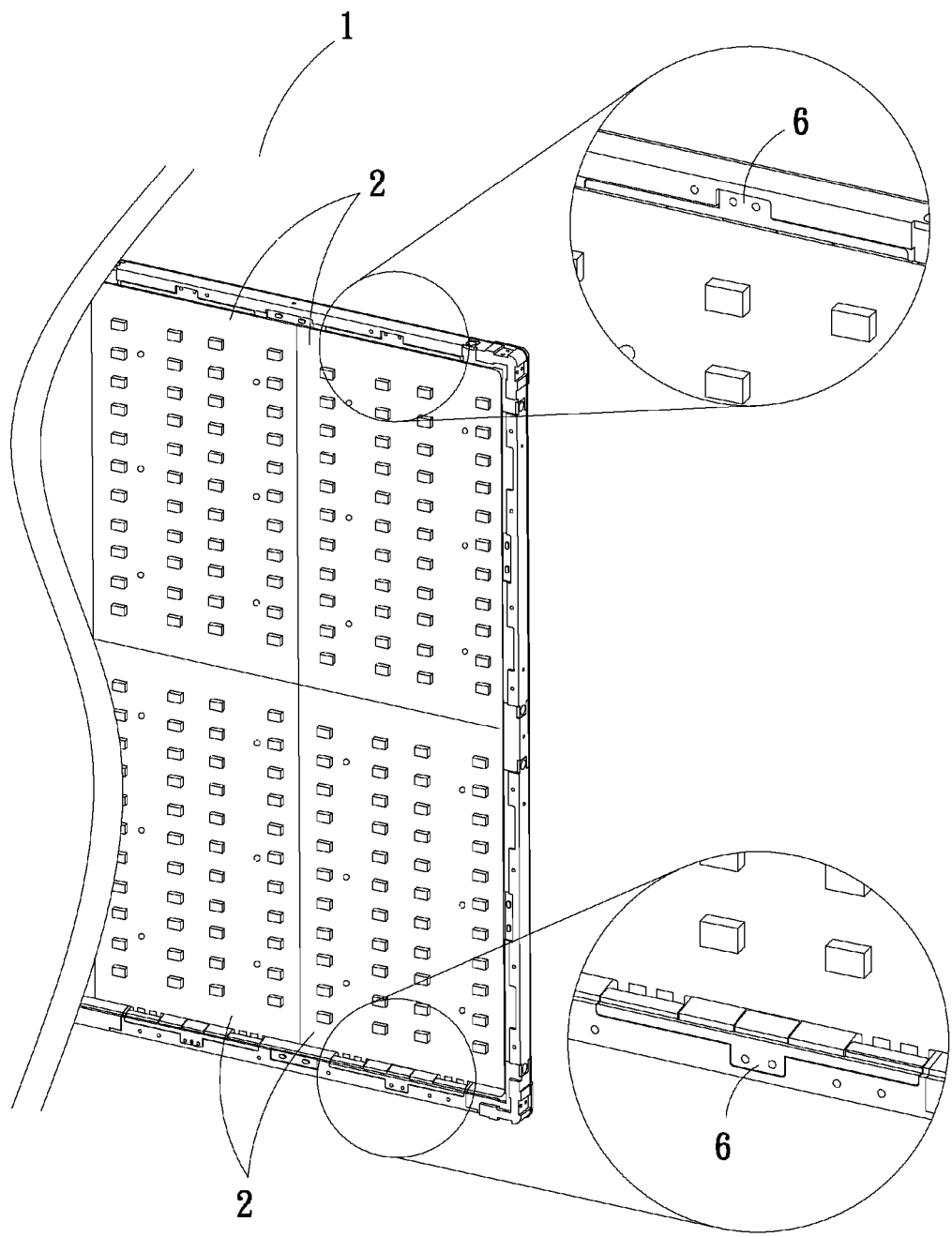
FIG. 8 is a fragmentary view of the assembled LED plates of FIG. 7.
Figure 9:
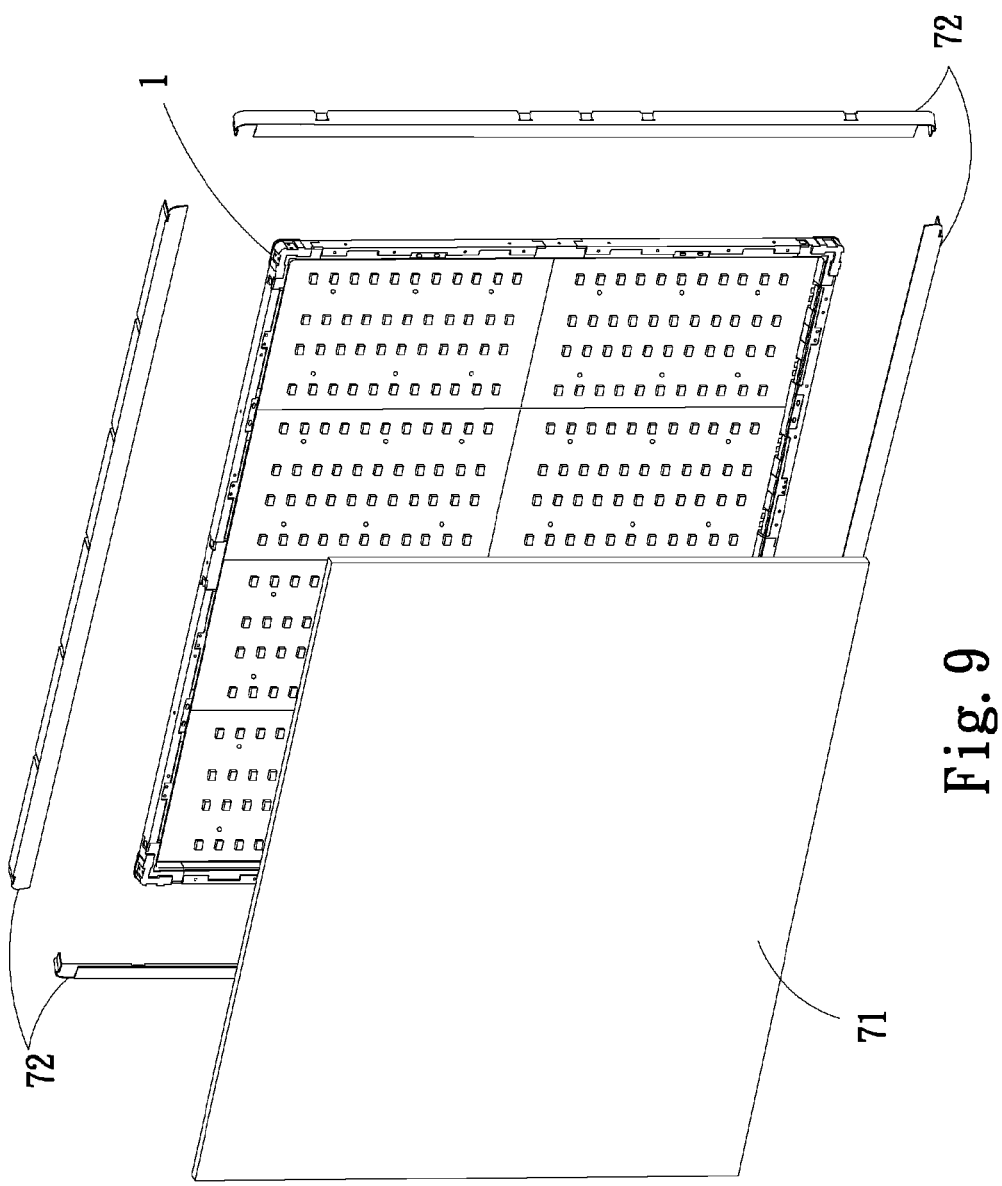
FIG. 9 is an exploded view of the assembled LED plates, four frame members, and an LCD panel to be assembled.
Figure 10:
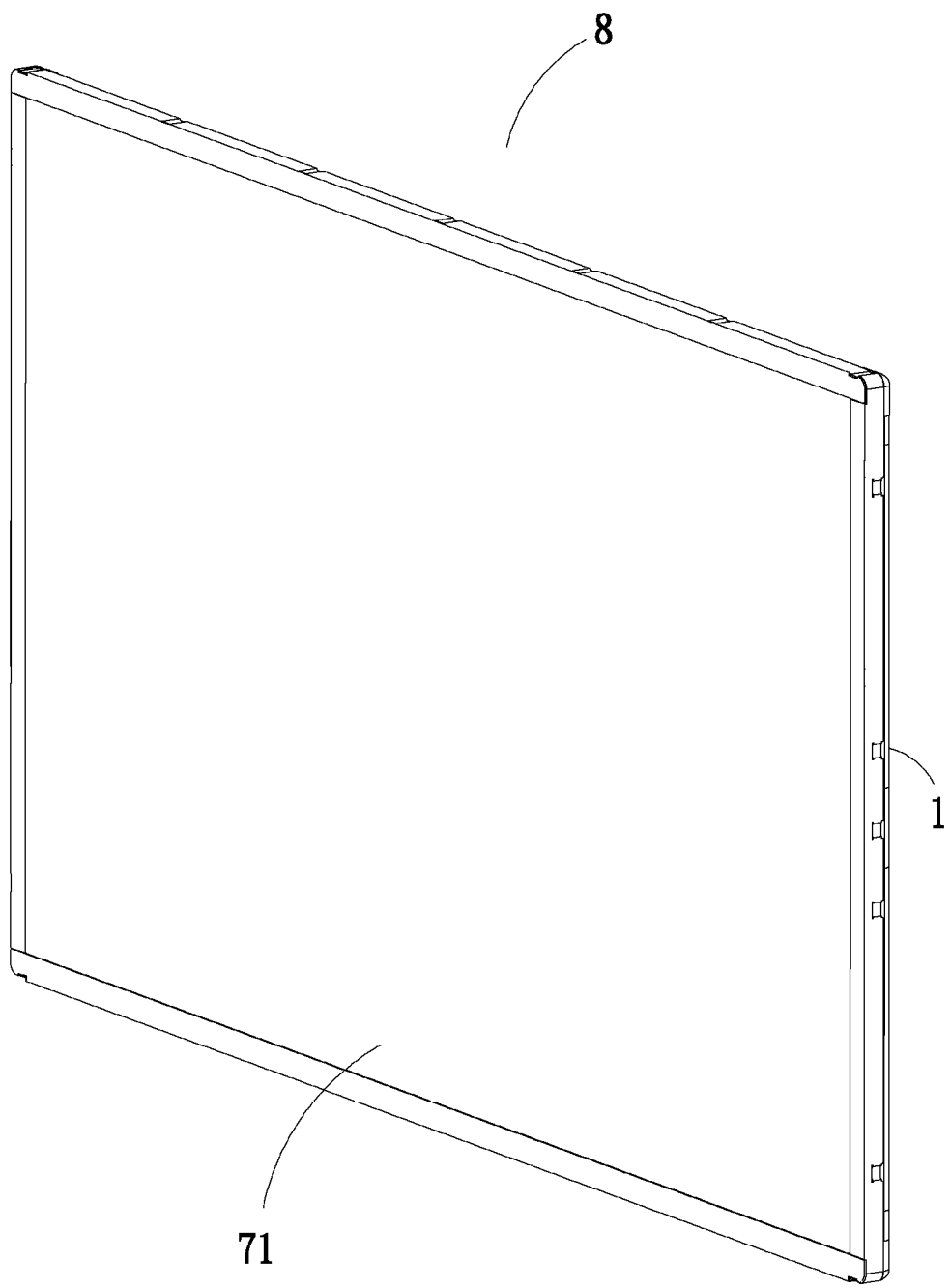
FIG. 10 is a perspective view of an LED backlit sign according to the invention after being assembled.

As shown in FIGS. 6 to 10, an LED plate 2 is rectangular and comprises a plurality of LEDs 21 arranged parallel in rows on the front surface, and a plate heat sink 22 on the rear surface. A plurality of LED plates 2 (e.g., eight LED plates as shown in FIG. 7) can be assembled using a plurality of frame elements 6 and corner joints. The rectangular heat sink assembly constructed in the above paragraph (i.e., as indicated by reference numeral 3 in FIG. 7) is mounted on the rear surface of the LED plates 2 to contact the plate heat sinks 22. A liquid crystal display (LCD) panel 71 is mounted on the front surface of the LED plates 2 using four frame members 72. As a result, an LED backlit sign 1 in accordance with the invention is finished.

It is envisaged by the invention that heat removal capability can be improved and a large LED backlit sign can be assembled with a minimum manufacturing cost.

While the invention has been described in terms of preferred embodiments, those skilled in the art will recognize that the invention can be practiced with modifications within the spirit and scope of the appended claims.

What is claimed is:

1. An illuminated sign comprising:
    a plurality of straight fin heat sinks framed together as a rectangle;
    a plurality of light-emitting diode (LED) plates framed together as a rectangle, each LED plate comprising a plurality of LEDs arranged in rows on a front surface, and a plate heat sink on a rear surface, the plate heat sinks being in contact with the straight fin heat sinks; and
    a liquid crystal display (LCD) panel mounted in front of the LED plates.

2. The illuminated sign of claim 1, wherein the straight fin heat sinks are framed together by joining two cross frame elements with an intermediate joint together they are mounted on each of top and bottom edges of the straight fin heat sinks, joining two side frame elements with another intermediate joint together they are mounted on either side of the straight fin heat sinks, and mounting each of four corner joints on two adjacent cross frame element and side frame element at each of four corners of the straight fin heat sinks.

* * * * *